United States Patent

Newton

Patent Number: 6,070,407
Date of Patent: Jun. 6, 2000

[54] DUCTED FAN GAS TURBINE ENGINE WITH VARIABLE AREA FAN DUCT NOZZLE

[75] Inventor: Arnold C Newton, Derby, United Kingdom

[73] Assignee: Rolls-Royce plc, London, United Kingdom

[21] Appl. No.: 08/755,020

[22] Filed: Nov. 22, 1996

[30] Foreign Application Priority Data

Jan. 4, 1996 [GB] United Kingdom .................. 9600068

[51] Int. Cl.⁷ .............................. F02K 3/02; F02K 3/075
[52] U.S. Cl. ......................... 60/226.1; 60/226.3; 60/271; 239/265.19; 239/265.25
[58] Field of Search ................................ 60/226.1, 226.2, 60/226.3, 271, 262; 239/265.19, 265.23, 265.25, 265.29, 265.27

[56] References Cited

U.S. PATENT DOCUMENTS

| | | |
|---|---|---|
| 3,167,911 | 2/1965 | Sandre . |
| 3,841,091 | 10/1974 | Sargisson et al. ...................... 60/226.3 |
| 3,854,286 | 12/1974 | Klees ........................................ 60/262 |
| 3,875,742 | 4/1975 | McMurtry . |
| 3,886,737 | 6/1975 | Grieb et al. ............................ 60/226.1 |
| 3,897,001 | 7/1975 | Helmintoller, Jr. et al. ............. 60/271 |
| 4,010,608 | 3/1977 | Simmons ................................ 60/226.3 |
| 4,039,146 | 8/1977 | Wagenknecht ...................... 239/265.39 |
| 4,080,785 | 3/1978 | Koff et al. .............................. 60/226.3 |
| 4,175,384 | 11/1979 | Wagenknecht et al. ............... 60/226 B |
| 4,291,782 | 9/1981 | Klees ................................... 239/265.25 |
| 4,501,393 | 2/1985 | Klees et al. .............................. 60/262 |
| 4,926,633 | 5/1990 | Nash et al. ............................ 60/226.1 |
| 5,261,227 | 11/1993 | Giffin, III ............................... 60/226.1 |

FOREIGN PATENT DOCUMENTS

| | | |
|---|---|---|
| 955518 | 4/1964 | United Kingdom . |
| 0980306 | 1/1965 | United Kingdom .................. 60/226.3 |
| 1424193 | 2/1976 | United Kingdom . |
| 1546947 | 5/1979 | United Kingdom . |
| 1546956 | 5/1979 | United Kingdom . |
| 1596487 | 8/1981 | United Kingdom . |
| 2118248 | 10/1983 | United Kingdom . |
| 2165892 | 4/1986 | United Kingdom . |

*Primary Examiner*—Ted Kim
*Attorney, Agent, or Firm*—W. Warren Taltavull; Farkas & Manelli PLLC

[57] ABSTRACT

The fan duct of a ducted fan gas turbine engine is provided with a secondary duct at least partly within the downstream end of the primary duct. The secondary duct is provided with means such as flaps whereby the airflow therethrough may be varied to suit flight requirements of an associated aircraft, in a way which will control the maximum diameter of the free stream tube airflow at the intake of the engine, thus effectively reducing the frontal area of the fan duct, and therefor, drag.

2 Claims, 1 Drawing Sheet

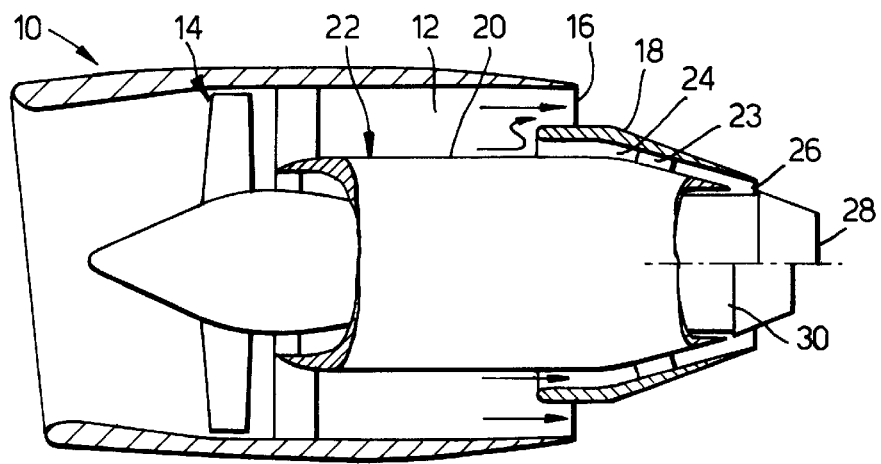
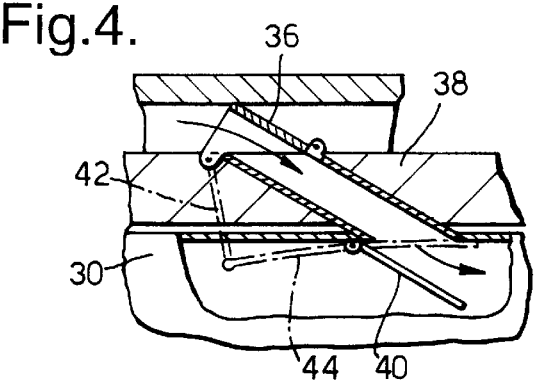
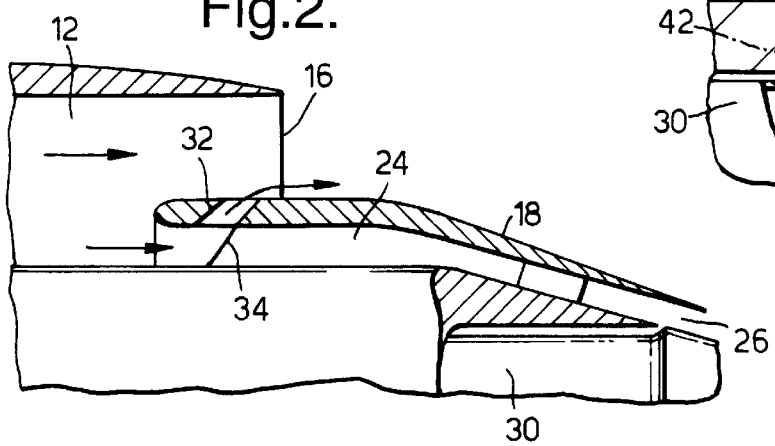
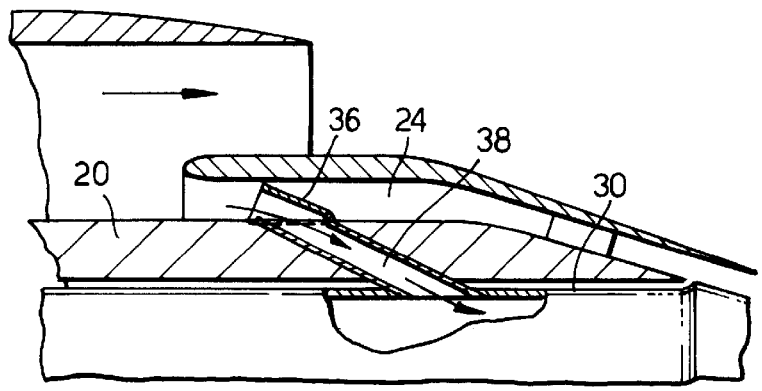

DUCTED FAN GAS TURBINE ENGINE WITH VARIABLE AREA FAN DUCT NOZZLE

THE FIELD OF THE INVENTION

The present invention relates to ducted fan gas turbine engines of the kind used to power aircraft.

BACKGROUND OF THE INVENTION

As the power output of ducted fan gas turbine engines rises, so do their structural dimensions, including the external diameter of the outer cowling of the fan duct. It follows that unless the dimensions are kept to the minimun possible, performance penalties in the form of increased installed drag will be generated.

A controlling factor in fan cowl design is the relationship between the highlight dimension (measured across the air intake lip in a plane which contacts the most upstream points on the lip) and the cowl maximum dimension (measured laterally of the engine axis). This relationship is defined by the size and change in the free stream tube flow into the engine. By the stream tube flow is meant that ambient air upstream of the engine air intake and extending to the air intake itself.

If the free stream tube size is maintained at its maximum size over the whole of the engine operating cycle, it will result in a cowl maximum dimension which is closer to the highlight dimension, thus effectively reducing the fan cowl profile and therefore the installed drag. This is achieved by virtue of that ambodiment air which flows over the exterior of the cowl, doing so with reduced change in direction.

Maintenance of the free stream tube size is achieved by varying the thrust controaruring given flight regimes.

The present invention seeks to provide a ducted fan gas turbine engine including an improved means for thrust control and resultant free stream tube size control.

SUMMARY OF THE INVENTION

According to the present invention a ducted fan gas turbine engine includes a secondary cowl at least partly within the downstream end of the fan duct thereof and radially spaced from the core gas generator of the engine so as to define a secondary fan duct, and means for selectively diverting fan air which would normally flow through said secondary duct to an exit nozzle thereof, into another path or paths for exit from a nozzle or nozzles other than that of said secondary duct.

BRIEF DESCRIPTION OF THE DRAWINGS

The invention will now be described, by way of example and with reference to the accompanying drawings in which:

FIG. 1 is a diagrammatic axial, part cross sectional view of a ducted fan gas turbine engine incorporating an embodiment of the present invention.

FIG. 2 is a diagrammatic part axial cross sectional view of a ducted fan gas turbine engine incorporating a further embodiment of the present invention.

FIG. 3 is as FIG. 2 but incorporating a third embodiment of the present invention.

FIG. 4 is a part view of FIG. 3 and illustrating an operating mechanism for the third embodiment therein.

Referring to FIG. 1. A ducted fan gas turbine engine 10 includes a fan duct 12 through which ambient air is driven by a fan stage 14, in known manner.

DETAILED DESCRIPTION OF THE INVENTION

The fan duct 12 terminates in a primary nozzle 16 which surrounds the upstream end of a cowl 18 which in turn is spaced from the casing 20 of the core gas generator 22 of the engine 10 by struts 23. A secondary duct 24 is thus formed and terminates in a secondary nozzle 26, downstream of primary nozzle 16, but upstream of the nozzle 28 of the jet pipe 30 of core gas generator 22.

The downstream end portion of the core gas generator is translatable axially of the engine 10 so as to achieve an effect which is described hereinafter.

The right hand end of the core gas generator as viewed in FIG. 1, is drawn so as to illustrate two operative positions that the translatable end portion of jet pipe 30 is required to adopt, depending on the flight regime of an associated aircraft (not shown).

The upper half of jet pipe 30 is shown axially extended to a position wherein it substantially blocks the nozzle 26, thereby stopping the flow of air through the secondary nozzle 26 and thus, for a given mass flow from the fan stage 14, increasing the thrust output. Such nozzle settings are used during takeoff of an associated aircraft, when the angle of incidence of the engine to the horizontal is such as to disrupt airflow over the engine in a manner which prevents control of the free flow tube.

The lower half of the jet pipe 30 is shown retracted, to a position wherein the nozzle 26 is left unblocked, so that fan air flowing through duct 24 can exit therefrom. This provides, for a given massflow from the fan stage 14, a larger nozzle outlet area, i.e. that of nozzle 16, plus that of nozzle 26, with a consequent reduction in thrust. These settings are adopted for cruise conditions, when the attitude of the engine axis is substantially horizontal, and, bearing in mind that an associated aircraft normally spends a far greater time at cruise than on takeoff, it is important to control the free stream tube profile. Where this is achieved, installed drag is reduced and for a given speed of travel, fuel economies result.

Having read this specification, the relevant skilled man will realise that the nozzle of a jet pipe 30 may be adapted so as to be movable to positions anywhere between the minimum and maximum stations, so as to affect the total nozzle area over a wide range of values, to suit varying flight condition and engine power settings.

Referring now to FIG. 2 in which like parts are given like numbers. In this embodiment of the present invention, the jet pipe 30 is fixed relative to the cowl 18 and its nozzle 26. The cowl 18 however, includes conduits 32 which, in a non operative position are closed, at least at their inner ends, by flaps 34. The conduits 32 are inclined and when operative, cut the duct 24 in fluid communication with the main fan duct 12 at a position upstream of the primary nozzle 16. The direction of inclination is such as to ensure that air flowing from duct 24 to duct 12 has a substantial downstream directional component so as not to unduly disturb the fan air flow already in duct 12.

The conduits 32 and their associated flaps 34 are equi-angularly spaced about the cowl 18 and the flaps 34 may be moved as appropriate, in unison, or in spaced groups to give full deflection of the air in duct 24 or part deflection. Thus, the magnitude of defected flow can be selected to suit the aircraft flight regime and engine power settings in order to maintain an advantageous free stream tubeflow.

Preferring now to FIG. 3 in which again, like parts have been given like numbers. In this embodiment of the present invention, the duct 24 is in fluid communication with the interior of the jet pipe 30 rather than the duct 12. Flaps 36 are equi angularly arranged around the core gas generator casing 20, and selectively open the outer ends of conduits 38, so as to cause fan air in duct 24 to flow to the interior of the jet pipe 30. Manipulation of flaps 36 in the same way as flaps 34 in FIG. 2 will provide the same benefits there as.

Referring now to FIG. 4. As is known, the normal flow through jet pipe is extremely hot and it may be desirable to close off conduits 38 at both ends, so as to avoid a reverse flow of hot gases therethrough when fan air deflection is not required. Thus, flaps 40 are provided and are pivotally connected to the jet pipe wall and interlinked to respective flaps 36 via links 42, 44 so that they can be opened and close in unison.

It will be noted that no translating or powering mechanisms have been shown or described, for any of the arrangements of FIGS 1 to 4. This is because flap moving devices in the context of ducted fan gas turbine engines are well known, and the skilled man, having read this specification, will realise that he has a wide choice available, to apply to the structure of the present invention, to achieve its object without the necessity for further invention.

A further benefit which the present invention provides is that only the secondary nozzle area is changed by moving parts. Thus if those moving parts fail mechanically, the primary nozzle will still have sufficient area to enable continued operation of its associated engine in a safe manner.

I claim:

1. A ducted fan gas turbine engine having a primary fan duct having a downstream end, a core gas generator having a nozzle portion and including a secondary cowl at least partly within the downstream end of the primary fan duct and radially spaced from the core gas generator so as to define a secondary fan duct, said primary fan duct having an outlet area that is fixed and means for selectively diverting fan air which would normally flow through said secondary duct to an exit nozzle thereof, into another path or paths for exit from a nozzle or nozzles other than that of said secondary duct, said engine having an axis and said fan air diversion means comprising the nozzle portion of the core gas generator of said engine, said nozzle portion being translatable axially of the engine and relative to said secondary cowl and being so proportioned as to substantially block the exit nozzle thereof when translated to a fully retracted position.

2. A ducted fan gas turbine engine as claimed in claim 1 wherein said nozzle portion is translatable to a plurality of positions between fully extended and fully retracted relative to said secondary cowl so as to enable variation in the area of the nozzle thereof and so affect the magnitude of secondary fan flow therethrough.

* * * * *